Aug. 20, 1929.  D. R. LOVEJOY  1,725,360

RADIORECEIVING CIRCUIT

Filed July 10, 1925

INVENTOR
Dummitt Ross Lovejoy
BY
his ATTORNEYS

Patented Aug. 20, 1929.

1,725,360

UNITED STATES PATENT OFFICE.

DIMMITT ROSS LOVEJOY, OF NEW YORK, N. Y., ASSIGNOR TO LOVEJOY DEVELOPMENT CORPORATION, OF NEW YORK, N. Y., A CORPORATION OF NEW YORK.

RADIO RECEIVING CIRCUIT.

Application filed July 10, 1925. Serial No. 42,707.

The present invention relates to radio receiving circuits in which regeneration occurs either intentionally or unintentionally, and in which absorption and dissipation of a portion of the energy is employed to control the amount of regeneration. Since the amount of regeneration in a given receiver tends to vary at different frequencies, it is desirable to automatically vary the amount of absorption as the receiver is tuned to different frequencies. The object of the present invention is to adjust the absorption circuit in such a way as to obtain a variation in the amount of absorption to the proper extent for avoiding self-oscillation without unnecessary loss of sensitivity at any frequency within the range of the receiver.

I employ in carrying out my invention an energy absorption circuit coupled to the tuned grid circuit of a conventional triode circuit arrangement; the said absorption circuit includes a coupling coil and a resistance. The circuit may have its coupling made variable or the resistance may be variable; in either case it acts to absorb energy from the grid circuit and can thus be made a means to exactly counteract any undesired feed back that otherwise would occur for a given arrangement of the triode circuit. Whether the coupling coil or the resistance be the fixed element of the absorption circuit, the said fixed element should be made preliminarily adjustable to permit corrections required and due to variations in constants between different tubes. The invention is applicable not only to purposely regenerative circuits, but to circuits in which an inherent feed back occurs, so as to give together with the variable element a feed back corrective characteristic or gradient varying conformably or synchronously with the movement of the controlling device of the tuning member.

Figure 1:
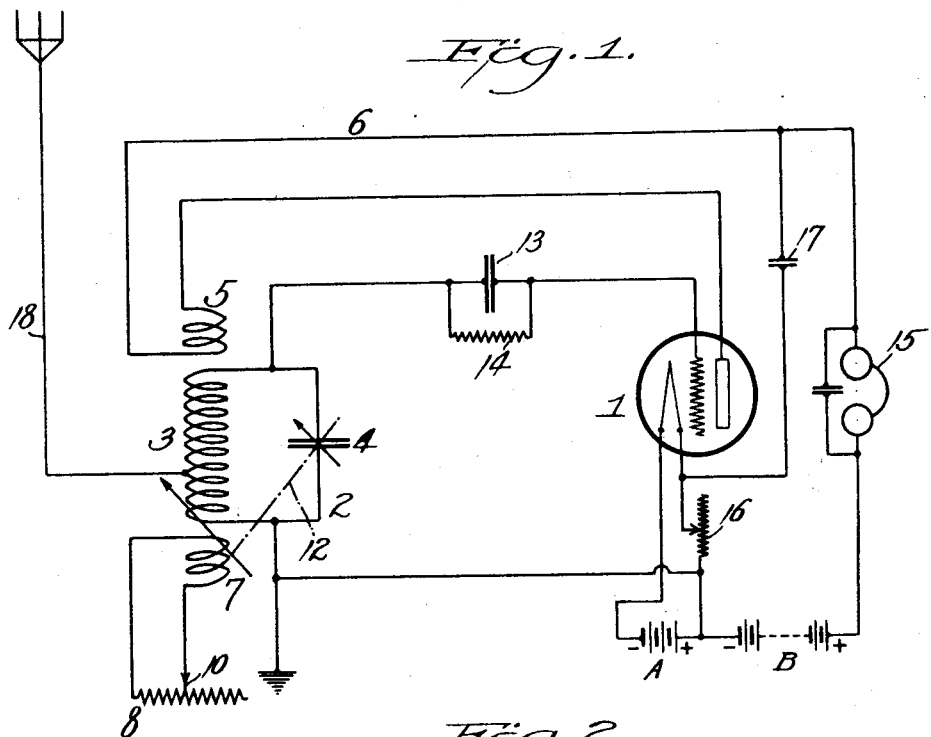
Figure 1 is a diagram of a detector circuit showing one application of my invention.

In Figure 1, 1 represents a triode tube arranged, for example, in a conventional detector circuit in which 13 represents the grid condenser shunted by grid leak 14. A is the filament battery including rheostat 16 in circuit therewith. B is the plate battery, including in its circuit the telephones 15 as an example of an indicator. 2 is a tuning unit in the input or grid circuit of the tube, which comprises an inductance element 3 and a condenser 4, the latter being shown variable. An antenna 18 coupled to coil 3 is provided for receiving the radio energy. In the case of an intentional feed back being used for regeneration, a coil 5 in the plate circuit 6 is coupled in fixed relation to the inductance 3 of the input or grid circuit. 17 is a by-pass condenser for high frequency currents around the telephones 15 and battery B. At 7 is shown a coupling coil variably coupled to inductance 3, the terminals of coil 7 being connected to a resistance 8 which in Figure 1 is assumed as being fixed although it has a means of preliminary adjustment as at 10.

Figure 2:
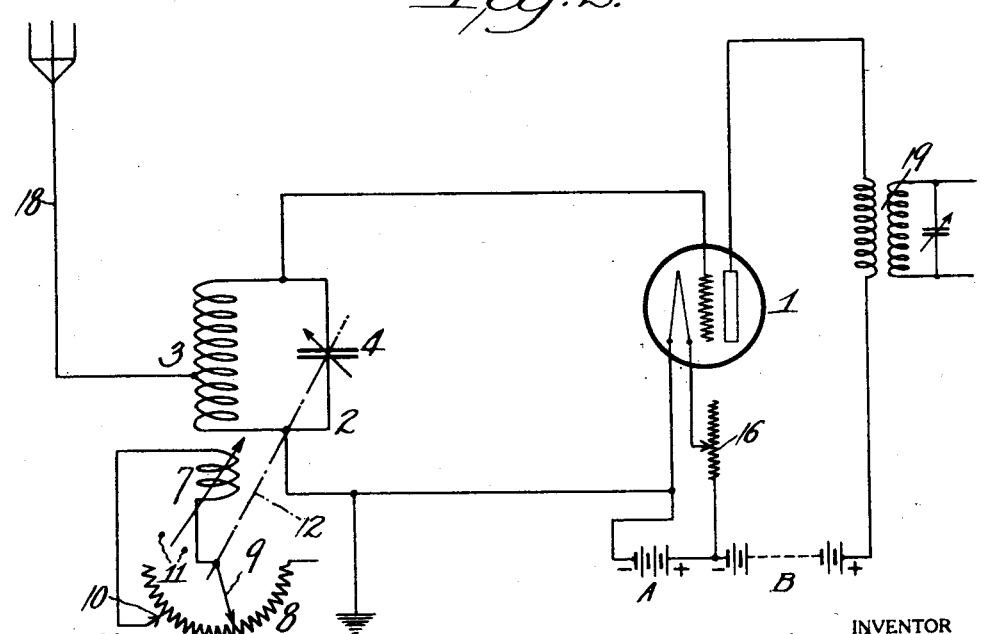
Figure 2 is a similar diagram showing an alternative arrangement, applied to a radio frequency amplifier circuit.

In Figure 2, which shows a similar absorption circuit at 7 and 8, the resistance is made variable by a movable contact arm 9 in which case coil 7, so far as its degree of coupling is concerned, should remain fixed, but it must be capable of preliminary adjustment as shown by the arrow through the coil and stops 11. Either form of control of the absorption circuits shown in Figures 1 and 2 may be employed in either figure without changing the effect desired.

In the case of Figure 1, where the resistance is not variable after the preliminary setting, the control variation required during operation is accomplished by varying the coupling of the absorption coil with respect to the tuned grid circuit. In this case by means of a proper coupling and the proper amount of resistance, I may secure a variable absorption which will give to the feed back such a characteristic or gradient as will make the movement of the control member of the absorption circuit conform to the movement of the control member of the tuning device. In other words, when the handle or knob of the tuning control, in this case of condenser 4, is moved through a given angle to change its adjustment for wave frequency, the handle of the coupling control of coil 7 will, when moved a proportional amount, leave just the right amount of energy in the tube input circuit that is required to give the best reception at the new wave length.

In Figure 2 the invention is shown applied to a tuned radio frequency amplifier circuit, in which as is known, an undesired inherent amount of feed back exists between the input and output circuit of the tube, so that due to this feed back excess the system produces undesired oscillations. By my novel arrangement the excess amount of energy fed back is absorbed from the input circuit so that these oscillations are thereby prevented. The conventional elements of which this circuit is composed are similar to those shown in Figure 1 and indicated with similar reference characters. The plate circuit of the tube contains a radio frequency transformer 19 which may be connected at its output side for instance to a detector circuit or to further amplifying stages not shown.

The absorption circuit applied to Figure 2 as a full equivalent and alternative to that shown in Figure 1 is arranged as follows: Instead of the coil 7 having its degree of coupling made variable as the input circuit is tuned, the resistance 8 is made the variable element by means of the control contact arm 9, the resistance ratio being such that proportional movement of the tuning control and resistance control maintain the proper relation. In this case the coupling of the coil 7 can be preliminarily adjusted within certain limits as already stated, but will remain fixed during use.

It should be understood that the preliminary adjustment of the coil 7 in Figure 2 or of the resistance 8 of Figure 1 will give an additional variant for controlling the effect of the feed back, thus correcting for differences in the constants of the tubes, antenna and the like.

Having provided means in the circuits just described with reference to Figures 1 and 2, for varying the feed back control according to the same gradient as the tuning control, it becomes an easy matter to set both controls to identical numbers on their respective dials. This renders it possible to connect the two controls mechanically so that only one control need be manipulated. Such a physical connection between the two variable elements preferably takes the form of a shaft 12, indicated in both figures by a dash-dot line, upon which are mounted the rotor of the variable condenser 4 of the tuning unit and the variable member either the absorption coil 7 of Figure 1 or the rheostat arm 9 of Figure 2, whichever form of control may be preferred.

Even if the resistance 8 is made permanently variable in unison with the tuning control as in Figure 2, it may be desirable to give this resistance an initial factory setting to determine its maximum value. This may be accomplished by the variable setting 10.

The term "gradient" as used herein is intended to mean the relation existing between equal spacial movements of an element and the successive values of the electrical function resulting therefrom.

While I have shown the absorption means as an auxiliary circuit, it will be evident that such absorption means may be inserted directly in the tuning circuit.

I claim:—

A radio receiver comprising in combination a triode tube having circuit connections including input and output circuits of a character to cause feed back of energy from the output to the input circuit in variable amount at different frequencies, means for tuning the receiver to different frequencies, a dissipation circuit for absorbing and dissipating a portion of the feed-back energy, means for automatically varying the amount of such dissipation with changes of tuning of the receiver, and means for adjusting the rate at which said automatic variation in the amount of dissipation occurs, to conform with the rate at which the feed back of energy from output to input circuit varies with change of frequency.

DIMMITT ROSS LOVEJOY.